(12) United States Patent
Gillaspie et al.

(10) Patent No.: US 9,405,656 B2
(45) Date of Patent: Aug. 2, 2016

(54) METHOD FOR REMOTELY TESTING THE OPERATION OF A COMPUTER SYSTEM

(71) Applicant: TESTPLANT EUROPE LIMITED, London (GB)

(72) Inventors: Jonathan D. Gillaspie, Golden, CO (US); Douglas P. Simons, Fort Collins, CO (US)

(73) Assignee: TestPlanet Europe Limited, London (GB)

( * ) Notice: Subject to any disclaimer, the term of this patent is extended or adjusted under 35 U.S.C. 154(b) by 0 days.

(21) Appl. No.: 14/262,343

(22) Filed: Apr. 25, 2014

(65) Prior Publication Data

US 2014/0325484 A1    Oct. 30, 2014

Related U.S. Application Data

(60) Provisional application No. 61/816,111, filed on Apr. 25, 2013.

(51) Int. Cl.
*G06F 9/44* (2006.01)
*G06F 11/36* (2006.01)

(52) U.S. Cl.
CPC .......... *G06F 11/3604* (2013.01); *G06F 11/366* (2013.01); *G06F 11/3664* (2013.01); *G06F 11/3672* (2013.01); *G06F 11/3684* (2013.01)

(58) Field of Classification Search
CPC ....................................... G06F 11/34–11/3696
See application file for complete search history.

(56) References Cited

U.S. PATENT DOCUMENTS

| 5,634,002 A | 5/1997 | Polk et al. |
| 7,870,504 B1* | 1/2011 | McIntosh ............ G06F 11/2273 715/704 |
| 9,092,500 B2* | 7/2015 | Varadharajan ...... G06F 11/3664 |
| 2006/0152509 A1* | 7/2006 | Heirich ................ G06F 11/362 345/426 |
| 2009/0103769 A1* | 4/2009 | Milov et al. ................... 382/100 |
| 2011/0276946 A1 | 11/2011 | Pletter |
| 2013/0014084 A1* | 1/2013 | Sahibzada ............. G06F 11/368 717/124 |
| 2013/0262347 A1* | 10/2013 | Dodson ............... G06F 11/3495 706/11 |
| 2013/0318463 A1* | 11/2013 | Clifford .............. G06F 11/1451 715/772 |
| 2014/0325484 A1* | 10/2014 | Gillaspie ............. G06F 11/3684 717/124 |
| 2015/0086115 A1* | 3/2015 | Danko ................ G06F 11/3692 382/190 |

FOREIGN PATENT DOCUMENTS

WO    2012027886 A1    3/2012

OTHER PUBLICATIONS

Chang, Tsung-Hsiang, et al., "GUI Testing Using Computer Vision", 2010, pp. 1535-1544.*
Takahashi, Juichi, et al., "An Automated Oracle for Verifying GUI Objects", 2001, pp. 83-88.*

(Continued)

*Primary Examiner* — Thuy Dao
*Assistant Examiner* — Christopher Franco
(74) *Attorney, Agent, or Firm* — Conley Rose, P.C.

(57) ABSTRACT

A method for remotely testing the operation of a computer system includes receiving a first element of the graphical user interface of the computer system, generating a user input action within the computer system in response to said first element, monitoring the computer system graphical user interface for an image transformation of an expected second element, and signalling a failure if a predetermined time interval lapses without detecting said transformation of an expected second element.

13 Claims, 4 Drawing Sheets

(56) References Cited

OTHER PUBLICATIONS

Anand, Saswat, et al., "Automated Concolic Testing of Smartphone Apps", 2012, pp. 1-11.*

Yuan, Xun, et al., "Covering array sampling of input event sequences for automated gui testing", 2007, pp. 405-408.*

Kropp, Martin, et al., "Automated GUI Testing on the Android Platform", 2010, pp. 67-120.*

Yu, Zhongxing, et al., "GUI Software Fault Localization Using N-gram Analysis", 2011, pp. 325-332.*

UK Search Report dated Oct. 21, 2014, for Application No. GB1407281.3, filed Apr. 28, 2014.

UKIPO Search and Examination Report dated Apr. 22, 2015 for Application No. GB1407281.3, filed Apr. 28, 2014.

* cited by examiner

METHOD FOR REMOTELY TESTING THE OPERATION OF A COMPUTER SYSTEM

CROSS-REFERENCE TO RELATED APPLICATIONS

This application claims the benefit of U.S. provisional application Ser. No. 61/816,111, filed Apr. 25, 2013, and entitled "Scaling Image Searches, Auto Naming, and Database Comparison in GUI-Based Monitoring and Testing, which is hereby incorporated herein by reference in its entirety.

FIELD OF THE DISCLOSURE

This disclosure pertains generally to computer systems, and more particularly to methods and techniques for monitoring, testing and controlling the operation of one or more computers through communications links.

BACKGROUND

With the early development of computers, all processing capability was located at a single computer system. These early machines were massive structures using many vacuum tubes, the result of which was the generation of an enormous amount of heat, and an associated sensitivity to environment. With these massive structures, all processing was performed centrally at this main computer, owing to the substantial expense required for isolation and environmental control. While remote communications with a computer system were sometimes used, the use was extremely infrequent and necessarily limited owing to the poor communications capability available at the time. These limitations of the need for environmental control and lack of adequate communications capability each persisted for several decades.

Progress in the semiconductor industry, initially with compact calculators beginning shortly after 1970 and followed by much more concentrated and capable chips suitable for computers less than a decade later, diminished and has ultimately virtually eliminated the need for extensive environmental control. Likewise, communications equipment, protocols and bandwidth compression have opened up the ability for substantial remote communications that were inconceivable only a few years ago.

For years, essentially from the days of first deployment of desktop computing, when a problem was encountered with a system, a computer user would be forced to resort to verbal telephone support with the hardware manufacturer. The waiting queues for these technical support personnel were notoriously long, with on-hold waits longer than an hour commonplace. When the technical support personnel were contacted, then the user would have to work verbally with the technical support person, and the support personnel would have to rely upon the computer users accurately describing the status and events, and performing operations requested by the support personnel. This arrangement was clearly less than optimum, requiring many times the effort that would have been required for the support personnel or a technician to directly diagnose and resolve the problem. Nevertheless, heretofore there has been little available for rapidly diagnosing the source of problems.

Unfortunately, many of the same issues and challenges face software vendors as those outlined above with regard to hardware manufacturers. When a particular program is prepared, the preparation work is usually performed upon a single type of computer having a particular combination of software installed thereon. All too frequently, the code will unintentionally rely upon components or features, such as may be found in the operating system, BIOS, system components or the like, which may vary from computer to computer. These variations may be based upon the release date of the particular computer, the software available at that time, upgrades provided by other vendors at the time of installation of their software, and other factors. At the time of deployment of early versions of the software, commonly referred to as alpha or beta versions, many of the incompatibility issues with diverse computers are discovered. Unfortunately, heretofore there has been no efficient way to diagnose the incompatibility, nor to quickly test the computer or isolate the source of the problem. Help databases have been prepared where persons may look for similar problems. Nevertheless, the amount of time involved in isolating and diagnosing a problem is still enormous and a source of much waste in the industry.

Even during the development of the software, substantial testing must be done. As is known in the art of programming, while a change in one part of the source code may not be expected to have an effect elsewhere, all too frequently this expectation is incorrect. As a result, even the most minor changes require substantial testing and validation to ensure that the changes do not disrupt the performance of a program at any other point. Presently, many software companies employ persons specifically in the role of testing. These persons will be assigned the chore of interacting with the computer as though they were a regular user, trying out each of the functions and determining whether any bugs may be identified. This approach also requires substantial operation by testing personnel, and is somewhat unreliable owing to the difficulty in determining whether the testers are, in fact, completing the testing properly and thoroughly. Nevertheless, this approach still provides cost saving over discovering a problem in the field after the software or hardware has been released more generally. Furthermore, the reputation of the company is improved by having fewer problems with the released software or hardware than competitors who utilize less thorough testing.

Software test engineers commonly test the functionality and behaviour of a program both pre and post launch. When performing testing, it is desirable to test out the software on a large number of devices and operating systems to ensure the product is ready for widespread sale for (and can be supported by) all types of computer system. A program which works well on one type of device may experience difficulties running on another type of device. The testing can therefore be a time consuming exercise. Accordingly, the test engineer may want to test multiple devices without having to physically interface with each System Under Test (SUT). Typically the same test will need to be executed a number of different times on the same operating system. Furthermore, when having to perform the same test on a number of different devices, the test engineer would ideally want to run the same sequence of steps without actually having to input each and every step for every test.

In the area of system administration, similar problems are also encountered. An IT professional will typically be called upon to implement a new program, upgrade or other such tasks throughout an entire network or system. In such instance, the administrator will frequently be required to visit each and every computer in order to perform the necessary tasks, and to verify the proper functioning thereof. This opportunity to access the computers has been made far more difficult with the advent of mobile systems and wireless communications, where many more of the computers connected through the network are not physically accessible at any given time.

In order to verify the performance of either software, hardware or a combination of the two, and regardless of whether the verification is being driven from the perspective of a manufacturer, developer, vendor, technical support, or internal maintenance within a single organization, this verification requires substantial interaction with the computer.

In an attempt to reduce the overhead associated with software debugging, a number of persons have developed methods for testing software by using a computer program. Many of these methods send information directly to the software or hardware, thereby bypassing the normal input channels and operations. Representative of the computer testing methods are U.S. Pat. No. 5,371,883 to Gross et al; U.S. Pat. No. 6,046,740 to LaRoche et al; U.S. Pat. No. 6,026,236 to Fortin et al; U.S. Pat. No. 5,022,028 to Edmonds et al; U.S. Pat. No. 5,249,270 to Stewart et al; U.S. Pat. Nos. 5,321,838 and 5,333,302 to Hensley et al; U.S. Pat. No. 5,335,342 to Pope et al; U.S. Pat. No. 5,594,892 to Bonne et al; U.S. Pat. No. 5,881,230 to Christensen et al; U.S. Pat. No. 5,926,638 to Inoue; U.S. Pat. No. 5,669,000 to Jessen et al; U.S. Pat. No. 6,119,247 to House et al; U.S. Pat. No. 6,195,765 to Kislanko et al; U.S. Pat. No. 6,249,882 to Testardi; U.S. Pat. No. 6,282,701 to Wygodny et al; and U.S. Pat. No. 6,353,897 to Nock et al; and 2002/0,099,978 to Kraffert, the contents of each of which are incorporated herein for their teachings of the various methods and techniques associated with the control and operations associated with such systems.

Test programs are known to test the functionality of an SUT. Typically the test program is run upon a computing device or computing system that is remote from the SUT. The computer system running the test program is however in communication with the SUT so that the test program can interact with the SUT. The SUT may be, for example, a PC running a version of Microsoft Word™ upon a Windows 7™ operating system.

Test programs typically test an SUT by interacting with the SUT and validating the state of the SUT according to an input test description (also referred to herein as a script). Test descriptions may also be referred to as automated test descriptions. Test descriptions can take many forms including but not limited to text instructions, software in source code or binary form, work-flows in a diagrammatical form (such as a flow chart). Executing (or 'running') the test description through the test program allows the system under test to be tested automatically, without requiring a test engineer to provide input to the testing process, other than initiating it.

Some test programs that use automated test descriptions are known. One test program that helps software engineers automate the testing process is 'EggPlant™' by TestPlant™. The EggPlant™ software tool allows a user to create and subsequently execute an automated test description to test a large number of SUTs. This test program interacts and controls an SUT by receiving and analysing images of the SUT Graphical User Interface (GUI).

Test programs such as EggPlant™ that utilise GUI images operate by identifying expected image objects in a GUI image that relate to executable functions that the test description may wish to identify and interact with or indicate the status of the SUT. Once the expected image object has been identified in the GUI image, the test program description can move to the next step in the test. The identification of the expected image object is performed using image analysis. The image analysis searches the GUI image for the expected image object using an existing reference image that is similar or identical to an expected image object. When a match is found, the expected image object is identified. Examples of image objects may include: an image of a button on the GUI that when 'clicked' would open a dialogue box, or the presence of a particular graphical object that signified the completion of a particular action performed by the target program. The test program may use image analysis techniques to perform these comparisons.

Reference images are typically created when generating the test description. When generating the test description the user typically uses the test program in a 'description creation mode', to navigate an SUT. Typically the navigation involves manually testing a particular SUT. As the user performs the testing steps, the information about the steps is entered into the test description. The test description is typically created either manually and/or automatically by a test engineer using the test program. Where commands in the test description require the use of reference images as described above, the user creating the test description manually selects the desired portion of a GUI image (taken from the SUT being tested) using an image selection tool whereby the selected portion of the GUI image is saved as the reference image.

When the test description is completed and subsequently run automatically by the test program to test a further SUT, the same testing steps are performed upon the further SUT using the same saved reference images. This can cause issues when the further SUT is different to the SUT initially used to create the saved reference images.

SUMMARY

In a first aspect of the present disclosure there is provided, in combination, a communications interface between a local computer and a remote system having a graphical user interface; a scripting language; graphical user interface language extensions that enable the scripting language to control the remote system responsive to images appearing on the remote system graphical user interface; and a remote system database; whereby the database is accessed and data retrieved therefrom compared with information captured by the remove system graphical user interface, and the comparison results are used to test the database status.

In a second aspect of the present disclosure there is provided a method for remotely testing the operation of a computer system. According to the method, a first element of the computer system graphical user interface is received. A user input action is then generated within the computer system responsive to the first element. The computer system graphical user interface is monitored for an expected second element within a predetermined time interval. The element may be a bit map representation, or may be transformed using one or more of a variety of image transformations. A failure is signalled if the predetermined time interval elapses without detecting the expected second element or a transformation thereof.

In a third aspect of the present disclosure there is provided a programmerator enabling a local system to remotely operate a computer system through local scripts and selectively respond to changes in graphical displays upon a graphical user interface of the remote computer system. A command capture interface displays a depiction of the remote system graphical user interface display and captures user input made therein. Images captured from the remote computer system are searched, both within and immediately adjacent to the image, to detect text that may be used to automatically name the image. A command language set implements user input emulations representative of captured user input at the remote computer system and also implements image processing of the remote computer system graphical displays when processed by the local system. A scripting language has scripting commands that control a flow of execution of the local system in combination with command language set. An interface communicates between local system and remote computer system graphical user interface, responsive to the command and scripting languages.

In a fourth aspect of the present disclosure there is provided a method for remotely testing the operation of a computer system, the method comprising the steps of: receiving, a first element of the graphical user interface of the computer system; generating a user input action within said computer system in response to said first element, monitoring said computer system graphical user interface for an image transformation of an expected second element; signalling a failure if a predetermined time interval lapses without detecting said transformation of an expected second element.

The fourth aspect may be modified in any suitable way as disclosed herein including but not limited to any one or more of the following.

The expected second element may be associated with the execution of the user input action upon the computer system The method may comprise the steps of: receiving a screen image of the computer system; and, scanning the screen image for the image transformation of an expected second element.

The method may be configured such that monitoring for an image transformation of an expected second element comprises: image transforming a saved image, the saved image comprising the expected second element; and, scanning the screen image for the transformation of the expected second element using the transformed saved image.

The method may be configured such that the image transformation performed on the saved image comprises any one or more of a transformation of: a color of the saved image; or, a resolution of the saved image; or, a dimensional scaling of the saved image; or, a rotation of the saved image; or, a vertical mirroring of the saved image; or, a horizontal mirroring of the saved image; or, a stretching of the saved image; or, a skewing of the saved image.

The method may be configured such that the saved image transformation comprises a dimensional scaling of the saved image and wherein the dimensional scaling comprises any one or more of: a predetermined fixed scaling ratio; or, a preselected range of possible ratios.

The method may further comprise the step of saving the scaling upon detection of the image transformed second element using the scaled image.

The method may be configured such that the computer system is a system under test, the method comprising the step of: providing an execution system; the execution system remote from the system under test and configured to: receive the first element of the graphical user interface of the system under test; and, monitor the said computer system graphical user interface for the image transformation of the expected second element.

The method may be configured such that wherein the execution system is configured to execute a script; the script comprises language that: is associated with an action intended for the system under test; and, when processed causes the action to be relayed to an execution environment; the method comprising the step of relaying the action from the execution environment to the remote system under test through a GUI interface.

The method may comprise the step of: selecting a subsequent user action upon the presence of the said transformation of the expected second element.

The method may be configured such that the step of monitoring said computer system graphical user interface comprises: monitoring said computer system graphical user interface for an expected second element and for a transformation of said expected second element.

In a fifth aspect of the present disclosure there is provided a method for monitoring the operation of a remote system under test using a local computer system, the local computer system configured to control the graphical user interface of the remote system under test; the method comprising the steps of: receiving an image of the graphical user interface of the remote system under test; detecting an image transformed expected element by scanning the received image using a transformed previously saved image, the previously saved image comprising the expected element; selecting a subsequent user action, responsive to the detection of the image transformed expected element.

The fifth aspect may be modified in any suitable way as disclosed herein including but not limited to any one or more of the following.

The method may be configured such that detecting the transformed expected element comprises the step of: executing a script, the script comprising language that is associated with an action intended for the system under test.

The method may be configured such that detecting an image transformed expected element comprises image transforming the saved image.

The method may be configured such that the image transformation performed on the saved image comprises any one or more of a transformation of: a color of the saved image; or, a resolution of the saved image; or, a dimensional scaling of the saved image; or, a rotation of the saved image; or, a vertical mirroring of the saved image; or, a horizontal mirroring of the saved image; or, a stretching of the saved image; or, a skewing of the saved image.

The method may be configured such that the saved image transformation comprises a dimensional scaling of the saved image and wherein the dimensional scaling comprises any one or more of: a predetermined fixed scaling ratio; or, a preselected range of possible ratios.

The method may further comprise the step of saving the scaling upon detection of the image transformed second element using the scaled image.

According to a sixth aspect of the present disclosure there is provided a programmerator system configured to give effect to any of the methods as claimed in any preceding claim.

The sixth aspect may be modified in any suitable way as disclosed herein including but not limited to any one or more of the following.

The programmerator system may comprise an execution system comprising: a central processing unit, a memory; an operating system; configured to comprise an execution environment for monitoring or detecting the expected elements.

According to a seventh aspect of the present disclosure there is provided a memory comprising commands that when executed by a computer processor gives rise to the method of any of the fourth or fifth aspects.

Exemplary embodiments described herein provide a high level interface between a computer and operator which will permit the computer to be controlled via a sequence of interactions. The computer may be monitored for display information which is expected, and also controlled in the event the expected information either is or is not obtained. The scripts may be executed through a remote interface, permitting remote testing, operation and evaluation.

Exemplary embodiments described herein may enable the execution of a plurality of user inputs directly through the computer system while responding to a video display. Exemplary embodiments described herein may enable the control of actions within the computer based upon the display. Exemplary embodiments described herein may provide this capability using high level controls and commands that are intuitive and readily used. Exemplary embodiments described herein may enable this interaction and control to be instituted remotely through a communications interface through common Internet connection.

Exemplary embodiments described herein may enable both hardware and software developers to thoroughly test and evaluate the performance and operation of their developments and enhancements rapidly and with only minimal expense. Exemplary embodiments described herein may facilitate database validation subsequent to expected entry of data in a remote system application. Exemplary embodiments described herein may recognize images that have been altered or transformed in one or more ways, to identify the original image and, in one embodiment, to further enable an automated determination of the particular transformation for further processing and evaluation. Exemplary embodiments described herein may permit a network or systems administrator to reliably, simply and quickly execute operations within an enterprise systems network, preferably without having to physically visit each of the computing devices within the network, and which would have been heretofore conducted with more time consuming, difficult and less reliable techniques.

BRIEF DESCRIPTION OF THE DRAWINGS

Exemplary embodiments of the present disclosure will now be described in detail with reference to the accompanying drawings, in which.

DETAILED DESCRIPTION

Figure 1:
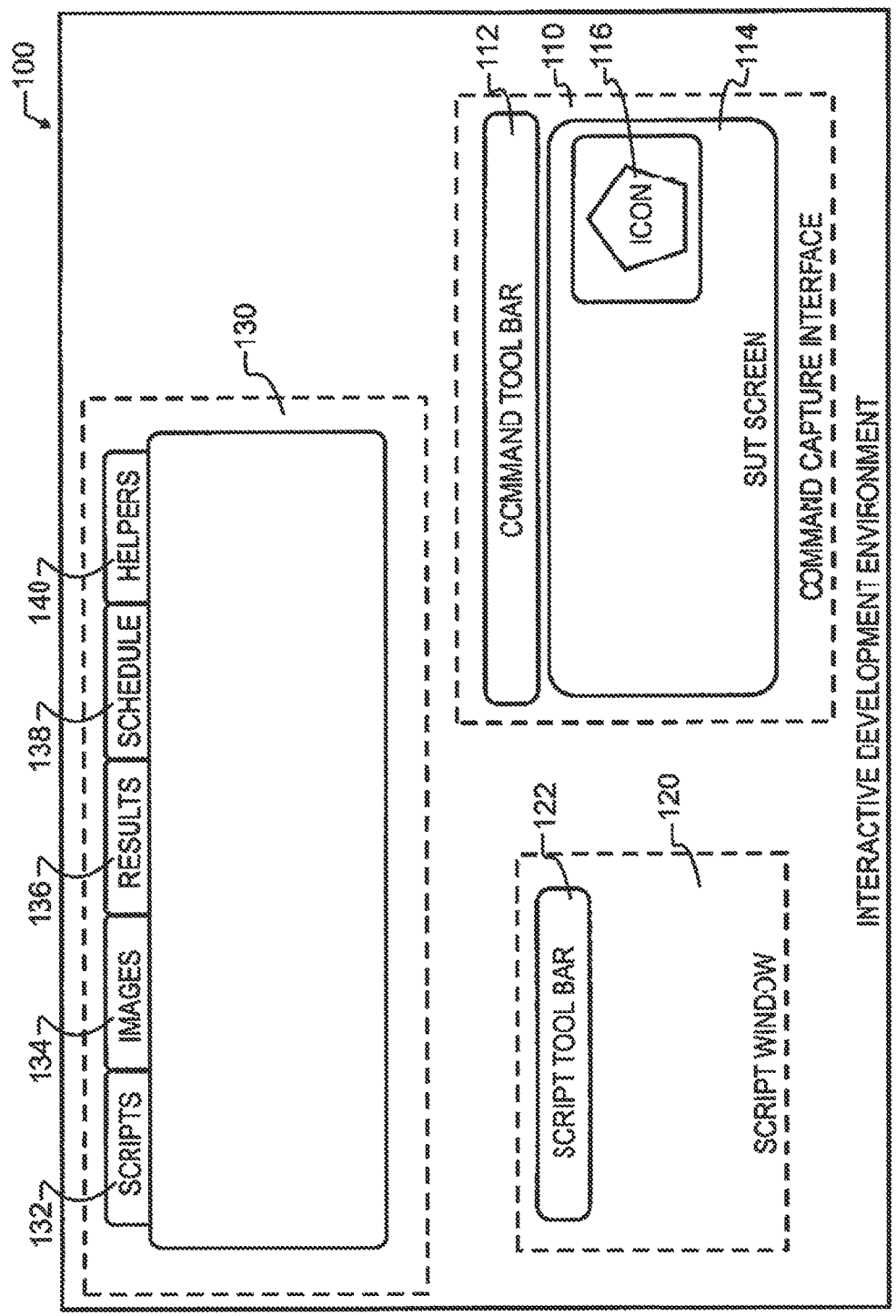
FIG. 1 illustrates a graphical user interface designed in accord with the teachings described herein.

Exemplary embodiments described herein provide a computer user the ability to control any other computer connected through an interface, using the standard graphical user interface (GUI). As illustrated in FIG. 1, a user interface which takes the form of an interactive development environment (IDE) 100, will preferably include several functional windows 110, 120, 130 therein. More particularly, window 110 provides a command capture interface which most preferably provides a system-under-test (SUT) screen display 114 which provides a visual depiction of the display screen generated by the system for which the operation of the interactive development environment 100 is designed to control. Within that display there will be various graphical representations 116 that may take the form of icons as illustrated, or various buttons, message boxes, prompts or any other graphical image or control. The depiction may be an exact copy of the remote graphical user interface, a resized or scaled version, or may further include various image manipulations and transformations such as color conversions or other manipulations as deemed suitable and appropriate for a given application.

In one exemplary embodiment described herein, a user will preferably select one or more of these graphical representations 116, such as by drawing a selection frame or box about a portion of the SUT screen display 114. Once a desired graphical representation 116 has been selected, the user will next choose to save the selection as an image. While in one embodiment the user will then be polled for an image name, in an alternative embodiment the image naming may preferably be automated either partially or wholly. Automation involves the integration of Optical Character Recognition (OCR), which is preferably used to process the selected image to determine whether there is text available that may be used to provide a default name for the selected image. The OCR processing may be bounded to only within the selected image, but preferably a larger area including pixels adjacent to and outside of the image will be scanned for text. Furthermore, remote or distal locations may also be used, such as title bars or other text that may be predetermined to present at a particular location. Particular known associations or clues may be used to logically find associated text, for exemplary purposes such as the recognition of particular colored regions surrounding a graphical icon and within which naming text is commonly associated.

The incorporation of OCR is particular useful for such elements as icons, which frequently will include the application name or similar relatively unique identifiers. Other elements, such as for exemplary purposes message boxes, command boxes, and text boxes, will have adjacent text or text within the image that will provide relatively unique identifiers. These may be element titles or headings, captions, or other text. For the purposes of the embodiments described herein, it will be understood that these identifiers may not always be unique, and so instead have been referred to herein as relatively unique identifiers. However, where subsequent elements are selected that have the same text within the image or within a region adjacent to or associated therewith as was found with a prior and already saved image, then known naming conventions for duplicate files will preferably be used to produce a unique name for the image. For exemplary purposes only, these could be the addition of a numeral that in combination with the relatively unique identifier is, in fact, unique to the collection of images being used or generated at that moment.

A command tool bar 112 is provided which allows a user of interactive development environment 100 to select what type of command or action will most desirably be implemented at any given state within the system-under-test screen display 114. These commands will most desirably replicate the functions at the system-under-test 290 as though they were, in fact, executed directly upon that system. Preferably, such commands will include keyboard commands and mouse commands, though it will be understood that any form of user input may be emulated. Consequently, touch screen monitors, graphics pads or tablets, and any other type of primary or peripheral input device may be emulated as required and designed for. In the case of the keyboard commands, two commands may, for exemplary purposes only and not limited thereto, be implemented. The commands include a "Type-Text" command and a "TypeCommand" command. These two commands permit any keyboard input available to be implemented, and yet provide a very understandable means to implement the same. In other words, where simple text must be entered, the "TypeText" command will be utilized. Where function and command keys are to be implemented, the "TypeCommand" function may be used. These commands are most preferably higher level language commands which will later be processed by a specific language extensions processor 255 described in greater detail herein below with regard to FIG. 2. Similarly, such mouse functions as "Click", "DoubleClick", "RightClick", "MouseButtonDown", "MoveTo", "Drag", and "MouseLocation( )" may be implemented. For the purposes of this disclosure, and as is commonplace in the computer arts, it will be understood that the use of parentheses denotes the implementation of a function that may include data or other variables that are being passed either from or to the function. Special commands such as "ClickAny", the operation which will be described herein below, may also be implemented.

Operation of the embodiments described herein depends upon the graphical user interface. The myriad of possible functions and displays that may be produced as a result of an operation are extensive. For example, there are times where an operation may result in an introduction of one of a variety of controls.

Where a single entity is anticipated, the image of the entity can be stored through the command capture interface window 110, and, when such image is later detected during execution of a script, an appropriate action can be selected, such as the "Click" command which would represent a mouse click upon a particular point in the screen. While many times this "Click" command may be executed directly upon the entity which newly appears upon the system-under-test screen 114, the direct action upon such an entity is not required. Instead the user of interactive development environment 100 has complete control over any of the user actions that may be relayed to the system-under-test 290, such as providing typed text, commands, movement of the mouse, and so forth. Consequently, the appearance of an object may stimulate any suitable action. Where such action would be to send a click on any active component that may appear on the screen, the "ClickAny" command will most preferably be provided, which enables the click to occur on any entity that may appear. Furthermore, in one contemplated embodiment, the activation of keystrokes or mouse clicks directly within the system-under-test screen 114 may be directly transferred as commands that are captured, or there may alternatively be a button to select which initiates and subsequently stops the recording of such within system-under-test screen 114 actions.

Since the embodiments described herein are designed to control graphical user interfaces, several commands are contemplated herein, but once again not considered to be solely limiting or restricted thereto. These image commands will most preferably include screen image searching commands and specific image information. Exemplary of the screen image searching commands are such commands as "WaitFor", "WaitForAny", "WaitForAll", "RefreshScreen", "ImageFound( )", "AnyImageFound( )", "ImageLocation( )", "AnyImageLocation( )", "EveryImageLocation( )", and other similar commands. A variety of information will most preferably be obtained or obtainable with regard to specific images, through such commands as "ImageInfo( )", "FoundImageNumber( )", "FoundImageName( )", "FoundImageLocation( )" "ImageHotSpot( )", and "ImageSize( )". Utilizing the above command set, it is possible to monitor a graphical user interface for any type or shape of image and then, responsive to the presence thereof, select a subsequent user action as though the user action were being performed directly upon the system-under-test 290 rather than from a source or controlling computer. In the event an unexpected event or entity appears upon the screen, the user, through the integrated development environment 100, has the opportunity to control the operation of the local and remote systems responsive thereto. For example, if a particular object is expected to appear upon the system-under-test screen 114 within a particular time interval, and the time expires prior to the object appearing, then it would be possible for a script entered within script window 120 to time out and cause an error message or warning message or the like to appear upon the local computer screen. The scripting window will most preferably provide access to functions and commands through, for exemplary purposes only, script tool bar 122 that are commonly associated with or available through any of the various scripting languages or more fundamental programming languages. Such functionality as decision structures, loops, timers, and the various other myriad of functions available therein as are well known will most preferably be incorporated herein, in accord with the particular language incorporated herewith or developed for operation herein. One such example is "SenseTalk", though other suitable scripting languages are certainly contemplated herein, and will be dependent upon the preferred operating platform or cross-platform capability desired.

Most preferably, interactive development environment 100 will additionally include a window 130 which provides access to various organizational functions, which may, in certain embodiments, be implemented using the familiar index tab analogy. Among the available index tabs may, for exemplary purposes only, be functions such as the storage of various scripts 132, images 134, results from past script executions 136, scheduling of planned script executions 138, and the identification and or the location of helper script and image files 140, which may be local, on a network, or located anywhere on the Web.

Figure 2:
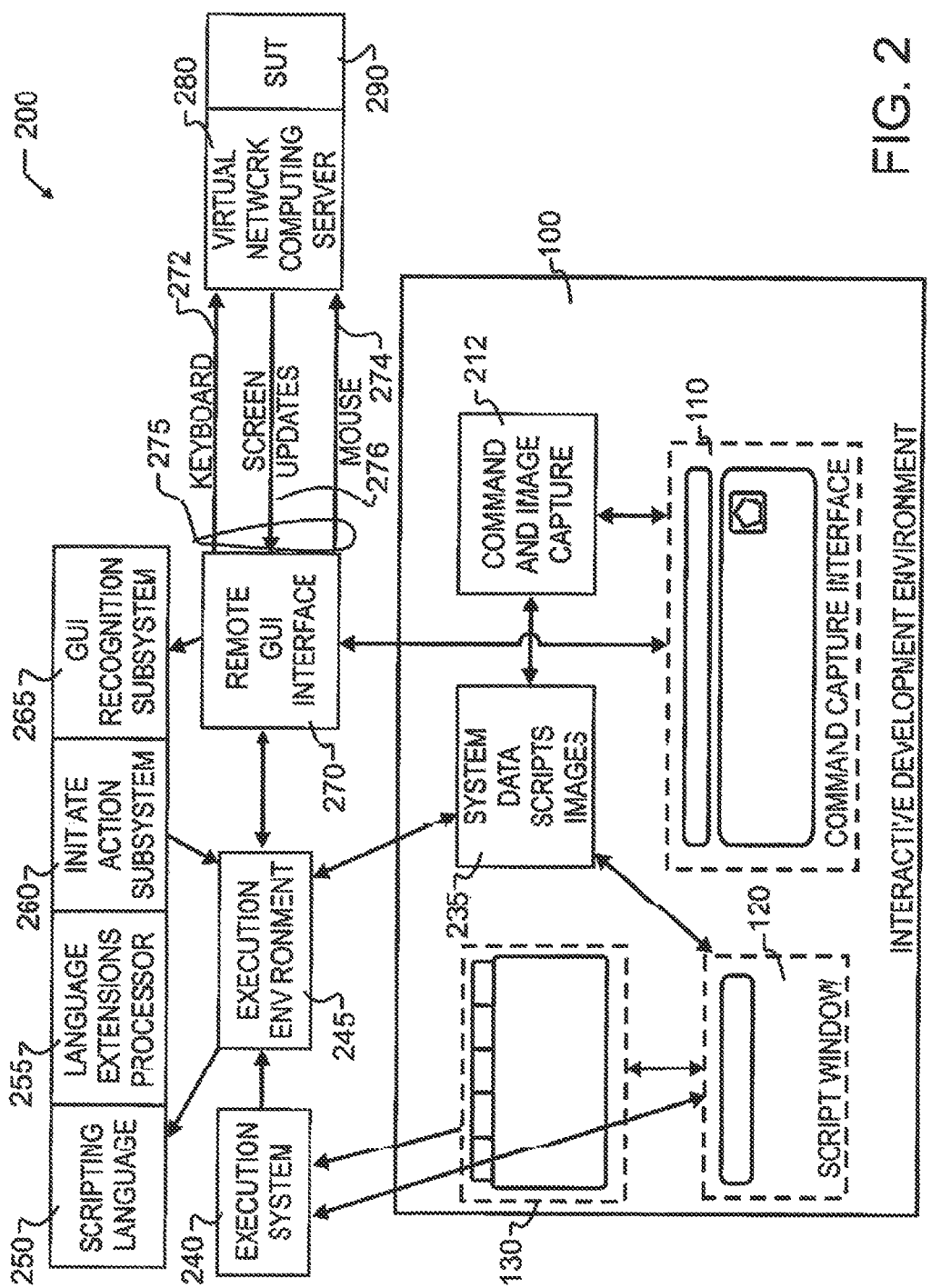
FIG. 2 illustrates a functional block diagram for the execution of functions designed in accord with the teachings described herein.

While FIG. 1 provides a basic overview of the user view provided through the interactive development environment 100, FIG. 2 illustrates the functional interconnection of the interactive development environment 100 components with the various additional components that are not visible upon the screen to form programmerator system 200. More particularly, the presentation of the system-under-test screen 114 is achieved by a remote GUI interface 270. A command and image capture system 212 is responsible for the capture of appropriate commands from command tool bar 112 and image information such as icon 116. Consequently, when a user selects a particular command, such as a mouse click or the like, this command must be captured and incorporated into the appropriate scripting information. Likewise, the inclusion of an expected image or others of the herein above described image or user control commands must be incorporated. These commands, which are not native to prior art operating systems, programming or scripting languages, are passed through to the system data, scripts and images controller 235. Controller 235 is responsible for the appropriate redirection and incorporation of command, graphics and scripts between execution environment 245, script window 120, and command and image capture system 212. For example, when a command is received from command and capture system 212, this command and any associated language will preferably be inserted into scripting window 120. Likewise, the passing of images from the execution environment 245 will occur through controller 235. Script window 120, which would in operation contain an active script, may be processed directly through execution system 240 for a real-time run, or may be passed through organizational window 130 for storage and scheduling therein.

Ultimately, a given script will be executed through the execution system 240, which is configured to carry out the processes specified within a script. While somewhat simplistic in description, the execution system 240 and execution environment 245 are typically comprised by the local CPU, memory, OS, and the like. The command processor or CPU will effect or control much of the execution within system 240, but will be monitoring a diverse set of status indicators, potentially both locally and at the system-under-test 290, programming calls, and the like. These various items being monitored comprise in part the execution environment 245.

As the script is being processed, execution environment 245 will need to call the scripting language processor 250, which may be an interpreter, compiler or other suitable language processor. The scripting language has been extended in the disclosed embodiment by various GUI commands and controls that are created through the command capture interface 110, such as the various mouse events and the like. Consequently, these commands must be processed not by the scripting language processor 250, but instead by a language extensions processor 255. As a result of the processing of the scripting language and the language extensions, an action may require to be initiated, which would be detected and triggered in the initiate action subsystem 260, which will relay the action back to execution environment 245. In the event this is an action intended for the system-under-test 290, such action will be relayed from execution environment 245 through remote GUI interface 270. The purpose of the remote GUI interface 270 is to implement an interface with the remote system-under-test 290, preferably relatively independently of the characteristics of communications channel 275 used and the data exchange rate associated therewith. This consists of providing client function to facilitate communication with the GUI server on the remote system-under-test 290, and to implement any needed out-of-band communication. Included are such operations as the client-server functions of retrieving images, sending keyboard and mouse commands, and initiating error recovery procedures as needed.

Communications channel 275 will in an embodiment include a keyboard channel 272, mouse channel 274, and a transfer of screen updates from VNC server 280 back to the remote GUI interface 270. Communications channel 275 may be a high speed trunk line or cable, or may alternatively be a relatively slow-speed dial-up or RS-232 type connection. With proper selection of components, the embodiment has much flexibility to operate through diverse communications channels having very different data transfer rates and signal to noise ratios.

To achieve broader application to more and more diverse systems-under-test 290, remote GUI interface 270 through a communications channel 275 communicates with remote computer virtual network computing server 280 or the like. As illustrated herein, the remote GUI interface 270 and VNC server 280 are most preferably VNC components which are readily available commercially and which operate as cross-platform components to directly interface with a remote system GUI. Nevertheless, other standard interfaces may be supported.

Images from the system-under-test 290 GUI will be relayed through VNC server 280 or the equivalent back to local system remote GUI interface 270, and from there routed to the GUI recognition subsystem 265. GUI recognition subsystem 265 dynamically scans the screen image of the remote system-under-test 290 for any bit-map images which the initiate action subsystem 260 is searching for. The goal of GUI recognition subsystem 265 is to locate images and signal the presence of such images to the initiate action subsystem 260 through an image detection signal, initiate recovery procedures such as moving the mouse cursor to locate images, or to report that the sought-after images are not available. GUI recognition subsystem 265 cooperates with the initiate action subsystem 260 and language extensions processor 255 output to determine whether a desired event or image has been created and if so, to execute the desired image identification actions requested within the language extensions received from language extension processor 255 through the execution environment 245.

Initiate action subsystem 260 initiates any action requested by the language extensions received from language extensions processor 255, which could be active commands to type text through the keyboard or to move the mouse in a number of ways. The commands may also in certain embodiments include passive commands to search the screen image on a continuing basis for a specific bit-map image, and, for exemplary purposes, terminating the search after a given period of time has elapsed.

While the disclosed programmerator system 200 depends upon GUI image location, this may be practiced in one of several different ways. One approach is to directly map bits and to locate based upon this matching bit pattern. Said another way a black border with a blue interior and a yellow button bar may comprise the image of interest, which might, in this case, be a control or graphic. However, when some potential systems-under-test 290 are configured with a different color scheme, the same control may be comprised of a different color set and would, using this simpler approach, go undetected. Several approaches may be used to overcome this limitation. One such approach is to develop a custom color scheme at the local computer, in effect translating the remote system-under-test 290 display to the local color scheme. This may, for example, be achieved by accessing the system-under-test 290 and determining the color scheme being implemented within the operating system or the like to determine what color translations are required to restore color variations to a common baseline. Another approach is to map and convert the images based upon geometry into particular color sets. Yet another approach is to convert to black and white colors.

Each of these aforementioned extensions to the basic bit map matching provide enhanced matching capability, and might for exemplary purposes be processed through the GUI recognition subsystem 265. These extensions may be referred to more generically as image transformations, and the purpose of the transformations is to extend the flexibility of the testing procedure to accommodate variations in color schemes, screen resolution, and for other purposes.

While a color transformation has the apparent application for testing systems with differing color schemes selected, there are many other applications enabled by this feature. Since the present system is capable of selection of much smaller images or GUI elements upon a screen, any icon or other element may also be detected. Preferably, when a color-transformed element is detected, the programmerator system can then return the color-transformation used to detect the image, and then use that particular returned color-transformation as further data for additional script processes and procedures. While this returned scale may serve many purposes that will be apparent to those skilled in the art upon a reading and consideration of the present disclosure, for exemplary purposes only, and not solely limiting thereto, if an application under test returns a color-transformation from a multi-color element to a gray-scale, then in some instances the person developing a test script might understand this to mean that the element is detected, but is in a non-enabled or inactive state. Another exemplary application for a color transformation is where color is used to indicate status, such as in testing or monitoring dashboards and IVIs.

In one embodiment, these image transformations will include dimensional scaling of an image. This may be a pre-determined and fixed ratio scaling, such as for exemplary purposes might be used to check for images on various systems that might be running at different ones of the various predetermined video resolutions. However, in a further embodiment, the scaling will preferably be automated, wherein any scaled image within a pre-selected range of possible ratios will be detected. By providing this "range of ratios" scaling as an automated but optional procedure, a tester may rapidly build a test operable on a wider variety of system configurations with almost no extra effort.

This scaling offers improved detection not only for different video resolutions, but also for different user settings. For exemplary purposes only, and not solely limiting thereto, a user might select a larger icon size or font size than is the standard or default. A test of this system without this image scaling capability would then fail, since the icon is now a different size than originally programmed for. However, using this scaling transformation, the icon would still be detected.

Preferably, when a scaled image is detected, the programmerator system can then return the scaling used to detect the image, and then use the particular returned scale as further data for additional script processes and procedures. While this returned scale may serve many purposes that will be apparent to those skilled in the art upon a reading and consideration of the present disclosure, for exemplary purposes only, and not solely limiting thereto, if an application under test has a main window, icon or image that is detected early in a script, such as upon start-up, the particular scaling used to detect this initial window or image may then be used to apply to and accelerate later graphical element detection.

While color transformations and scaling transformations have been discussed herein above, the embodiments described herein are not solely limited thereto. In the art of graphics programs, represented by such common programs as Adobe Illustrator™, Corel Draw™, Photoshop™, Paint™, and the many other graphics programs, there are many other image transformations that are known and available for image recognition. Exemplary transformations provided herein for the sole purpose of enablement, and not limiting the embodiments described herein thereto, include the scaling and color transformations described herein above, and for exemplary purposes may also include the rotation of an image, vertical and horizontal mirroring, stretching and skewing. Rotation may be a simple angular rotation about a point, such as the rotation of a portrait image to a landscape orientation, or may be any of the more complex and potentially three-dimensional rotations such as are used in animations, CAD modelling, and for other applications.

While the foregoing descriptions may at first blush appear to be directed to the testing of a single application or a single sequential operation within an SUT screen 114, no such limitation is intended or implied. Instead, and where desired, a plurality of applications may be accessed or operated as a part of a single script. For exemplary purposes, database comparisons are performed using the same graphical access as has been afforded by the programmerator system as has been described herein above. An application that stores data to a database, or that retrieves data therefrom, may be tested by interaction with the application, and separate interaction directly with the database. This data may be directly compared without further manipulation, for exemplary purposes such as when an application receives text and stores the text as provided into the database. This could, again for exemplary purposes, be a surname field in the application, which is then stored directly into a surname field within the database. The programmerator system may first launch the application, and then interact therewith by providing a test surname. Processing within the application may then be carried through until the surname should have been posted to the database. At any time subsequent thereto, a database explorer that provides separate and direct access to the contents of the database will preferably be launched, and the database contents accessed to determine if the surname was, in fact, properly stored in the database. Likewise, an application may read data from the database, and the application output may be directly compared with output from the database explorer to determine whether the two are identical.

Most preferably, beyond direct reading of the database and indirect reading or writing of the database through an application under test, further transformations or business logic may be applied to either or both of the data from the application under test and from the database explorer. Most preferably, these transformations or business logic may take many forms, and for exemplary purposes only and not solely limiting thereto, may include one or a plurality of such transformations as mathematical manipulations, character manipulations, logic-based operations, and other transformations as known and which may be desired for a particular purpose or application. In such case, the user will enter into the programmerator system the desired transformations, so that these transformations may then be applied to either the data from the database, the data from the application, or to both. This permits a wide variety of database applications and web portal applications to be thoroughly tested.

The SUT and Test System

The term 'script' used above may also be termed a "test description" and may also be termed throughout the application as an "automated test description". The local computer (controlling an SUT 290) described above may also be termed a test computer system 6.

The test description is preferably configured, when executed, to cause a test computer system 6 to communicate with an SUT 290. The communication between the SUT 290 and the test computer system 6 is intended to mean one or more pieces of data is transferred, either directly or indirectly, between the two entities, i.e. data sent directly or indirectly from the test computer system 6 to the SUT 290 and/or data sent directly or indirectly from the SUT 290 to the test computer system 6.

Figure 3:
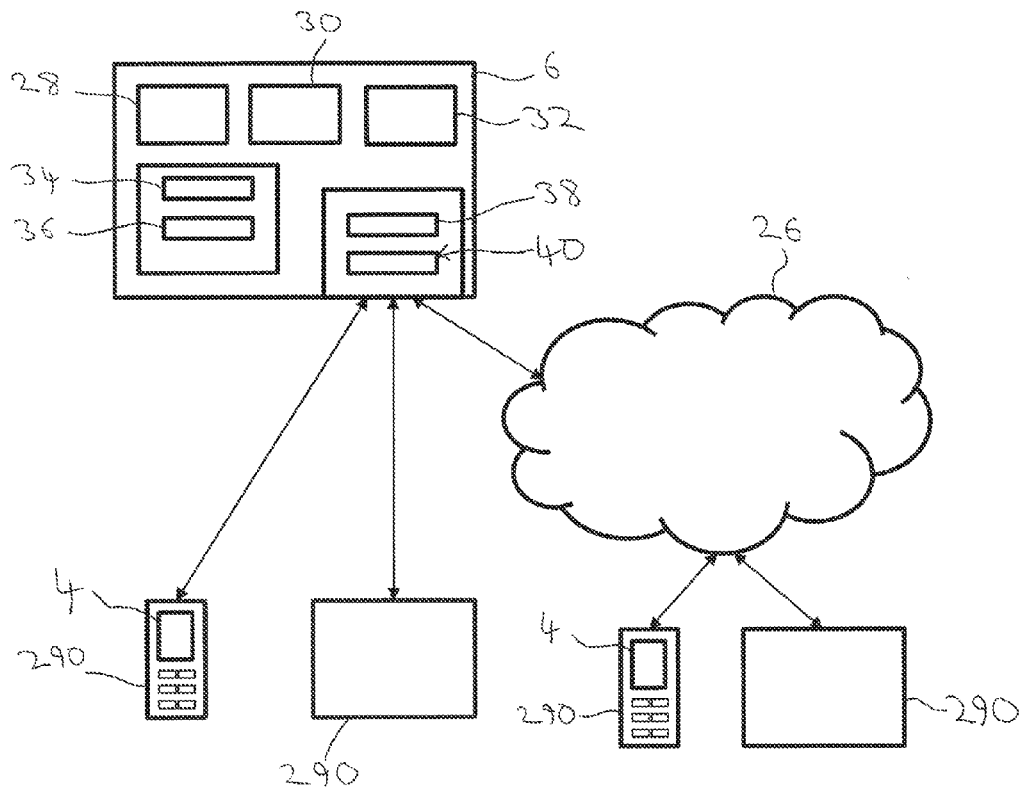
FIG. 3 shows an example of a test computer system that is in communication with several systems under test.

By communicating with the SUT 290, the test computer system can interact with the SUT 290, for example by receiving GUI images and/or sending commands to control the SUT. The automated test description is typically configured, when executed by a test program, to test the functionality and/or behaviour of an SUT 290. A test computer 6 communicable with several SUTs 290 is shown in FIG. 3.

Typically, a "test description" forms part of an "automated test". The test description is typically lines of text or other characters that typically contain instructions, that when executed by the test program, cause the SUT 290 to perform particular actions or execute functions. An instruction in the description can include one or more standard commands and/ or one or more other pieces of information or data. For example, the command "Typetext" may be followed by the words "This is a test". The test program running the automated test would execute the standard command "Typetext"

to cause the SUT 290 to type the words "This is a test" into a particular text entry box on the SUT GUI.

The automated test may have further metadata associated with the description. Such metadata may be, an image associated with a particular instruction in the description. The test may be stored using one or more storage device or computer readable media as described herein.

For the purposes of this application, when reference is made to the test program running the test description, this is taken to mean the running of the automated test.

The SUT 290 typically comprises one or more computer programs being executed upon a computer device.

The SUT 290 may be remote from the test computer system 6. The term 'remote' is intended to mean that the computer system or device is physically separate to the test computer system 6 such that when the test computer system and remote computer system (SUT) interact, one or more transmitter and receiver devices are used to send and receive data over one or more communication channels. The communication channel may be any suitable channel using any of electrical, electromagnetic or optical signals.

Figure 4:
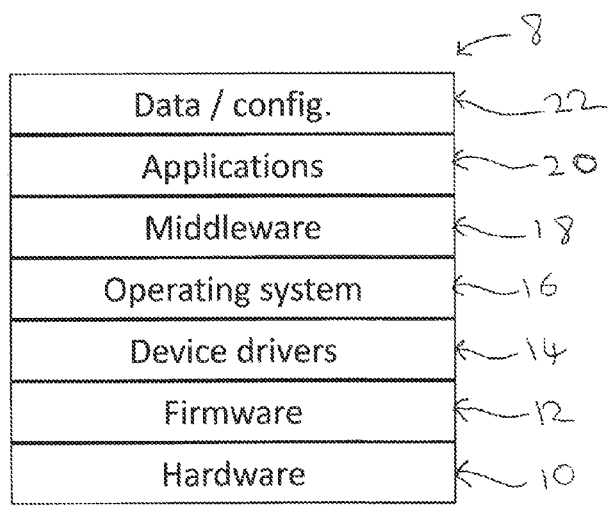
FIG. 4 shows an example of a hardware/software stack model representation for a system under test.

The SUT 290 can be any computing system or device running one or more computer programs. FIG. 4 shows an example model of a hardware/software stack 8 for an SUT 290. The test computer system 6 can control features or aspects of any of these layers by interacting with the SUT 290. The SUT 290 in principle can include any one or more parts of the hardware/software stack 8 of the system being tested 290, i.e. the hardware 10, firmware 12, device drivers 14, operating system 16, middleware 18, applications 20 and data/config 22. Typically an SUT 290 will at least comprise hardware 10 and an operating system 16. FIG. 4 is only an example of a hardware/software stack model 8. Other models with further details and layers may also be used to define an SUT 290. The term 'computer program' is taken to mean any of (but not necessarily limited to) an application program 20, middleware 18, an operating system 16, firmware 12 or device drivers 14 or any other medium supporting executable program code.

The term 'hardware' 10 is taken to mean any one or more of the collection of physical elements that constitutes a computer system/device such as, but not limited to, a processor, memory device, communication ports, input/output devices The term 'firmware' 12 is taken to mean any persistent memory and the program code/data stored within it, such as but not limited to, an embedded system The term 'device drivers' 14 is taken to mean the one or more programs that operate to control a particular type of device incorporated into or attached to the computer device/system The term 'operating system' 16 is taken to mean the one or more pieces, often a collection, of software that manages computer hardware and provides common services for computer programs The term 'middleware' 18 is taken to mean the computer software that provides services to software applications beyond those available from the operating system 16

The term "applications" 20 is taken to mean the computer software that causes a computing device or system to perform tasks that are typically beyond the running of the computer itself The term 'data/config.' 22 is taken to be any other information provided to the SUT 290 that can be used to affect its running or output, for example data input into the application program 20.

An SUT 290 may comprise a different physical device to another SUT 290 as shown in FIG. 3. For example, the SUTs may be different physical computing devices running the same application program 20 using the same or different application program 20.

Alternatively, an SUT 290 may differ from another SUT 290 simply by running a different operating system 16 and/or different version of one or more application programs 20. For example, a first SUT 290 may be a PC (i.e. the computer hardware) running an operating system 16 and a first version of an application program 20, whereas a second SUT 290 may be the same hardware 10 as the first SUT 290, running the same type and version of the operating system 16 but running a second, updated version of the application program 20. In principle, one SUT 290 may differ from another SUT 290 by virtue of any different hardware/software configuration. For example any change in any one or more of the layers in the stack 8 of FIG. 4 from hardware 10 to application program 20, may give rise to a different SUT 290.

Typically when the test computer device interacts with the SUT 290, it does so using a test program that executes the test description. Typically the test program is hosted on the test computer system 6. The description, when run (executed) by the test program, typically causes the SUT 290 to be controlled by the test computer system 6. For example, a line in the test description 24 run by the test program with the phrase "click button X" will cause button 'X' on the GUI of the SUT 290 to be selected and the operation associated with the selection of that button to be started upon the SUT 290.

FIG. 3 shows an example of a test computer system 6 in communication with several SUTs 290. Two of the SUTs 290 are being communicated with directly, for example using infrared or blue tooth communications, or over a local wired or wireless network, whilst two other SUTs are being communicated with via the internet 26.

The test computer device/system 6 may be any suitable computer device, system, collection of computing devices or collections of computing systems, such, but not limited to those described above for the local computer. The test computer system 6 may comprise any one or more of: one or more processors 28; one or more controller devices 30; one or more memory devices 32; one or more user input devices 36; one or more output devices 34 such as, but not limited to, a GUI; one or more communication devices such as a transmitter 38 and/or a receiver device 40.

Any one or more of the processor 28, controller 30, receiver 40, transmitter 38, or memory 32 may be a physical, non-transitory, device or apparatus. The devices/apparatus may be electronic, opto-electronic or optical.

The processor 28 may, in principle, be any suitable processing device such as, but not limited to, a microprocessor, an application-specific instruction-set processor, a graphics processing unit (GPU/VPU), a physics processing unit (PPU), a digital signal processor, a network processor, a front end processor. Examples of processors include, but are not limited to, an Intel™ processor, an AMD™ processor.

The controller 30 may be any suitable controller including any one or more of a controller chip, a controller board, a mainframe controller, an external controller or any other suitable controller. The controller may be, for example, a microcontroller.

The memory 32 may, in principle be any suitable memory including any one or more of: mechanical memory such as, but not limited to, magnetic tape drive, hard-drive, optical drive; volatile and non-volatile memory such as, but not limited to, RAM, DRAM, SRAM, SDRAM, T-RAM, Z-RAM, TTRAM, ROM, Mask ROM, PROM, EPROM, EEPROM, NVRAM.

The description may be written in any suitable scripting language, for example SenseTalk™. Preferably the description is loadable onto a carrier device such as a disc, memory stick or any other suitable electronic data carrier.

Using GUI Images

The test program may utilise one or more SUT graphical image outputs (for example GUI images) received directly or indirectly from the SUT 290. Typically the GUI images are "snapshots" of the output of the GUI of the SUT 290 at a particular time. Typically these snapshots are saved as a graphical image file, for example a bitmap, gif or jpeg file. The GUI images may be a snapshot of the whole GUI (such as those snapshots of the SUT GUI 4 shown in FIGS. 5*a* and 5*b*) or one or more portions of the GUI. GUI snapshots may be only portions of the GUI image that have changed since a previous GUI image was sent.

It is understood that a test program is typically used to execute the test description. However, the functionality required to execute the test description may be hosted by an operating system or any other software or dedicated hardware, for example the test description may be a stand-alone executable file itself.

The SUT 290 may send these GUI images to the test computer system 6 automatically upon an initial command to start sending the images. Additionally or alternatively the SUT 290 may send one or more GUI images upon a command sent from the test computer system 6. Additionally or alternatively the SUT 290 may send one or more GUI images upon a command sent to the SUT 290 resulting from an instruction from the test program, and/or the test description 24.

The GUI images may be sent continuously by the SUT 290 at a particular update frequency, for example the SUT 290 may send a new GUI image to the test computer every 0.3 seconds.

Example of Using a Transform

Figure 5A:
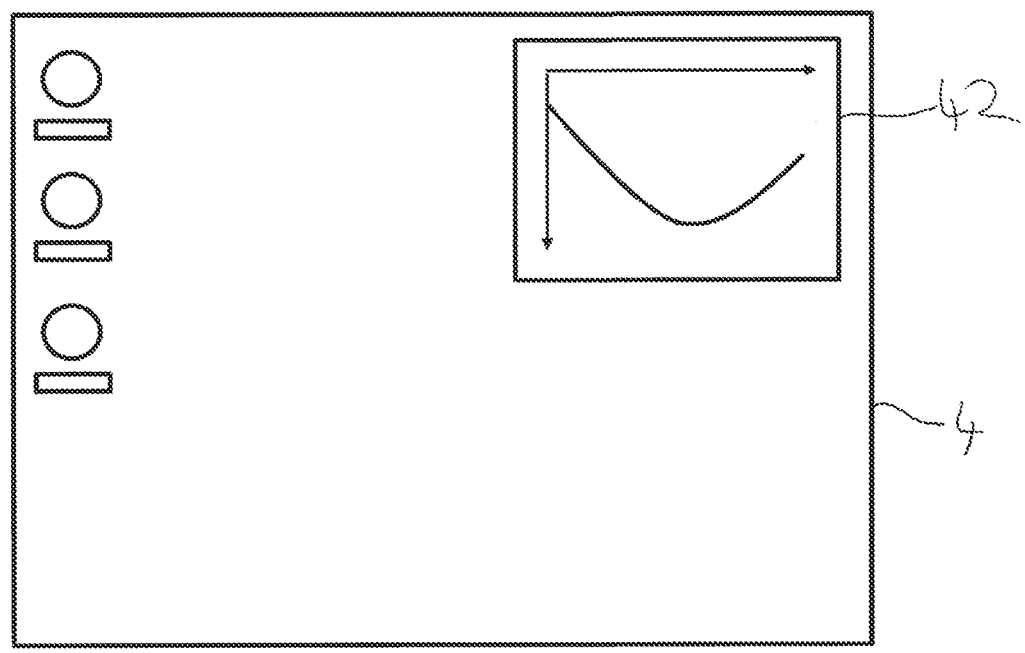
FIG. 5a shows an output from the GUI of an SUT at a particular point in time.
Figure 5B:
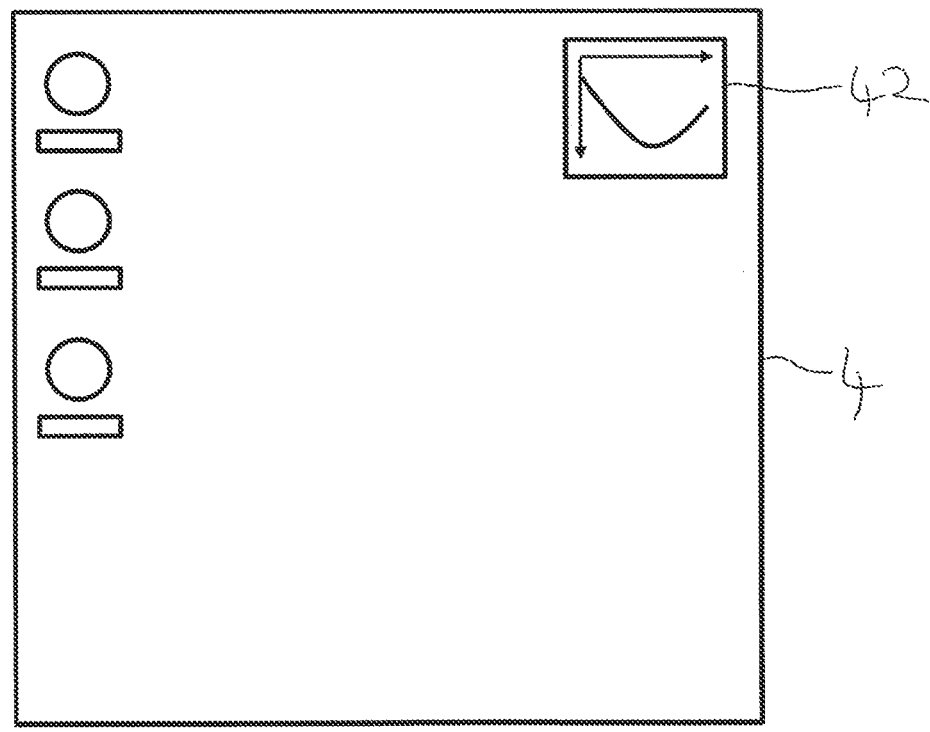
FIG. 5b shows a similar graphical output as shown in FIG. 5a wherein but from a different SUT wherein one of the graphical elements has been downscaled.

An example of using a transform as described herein is shown in FIGS. 5*a* and 5*b*. FIG. 5*a* shows the graphical output from an SUT that is sent to the local computer and displayed on a remote GUI interface 270 when the script (test description) is created. The SUT output shows six graphical elements on the left hand side of the screen output and a graphical element 42 on the right hand side of the screen output. The element on the right hand side shows a graph 42 having two axes and a curve. This element 42 is the element of interest in this example.

When creating the script, or at any time before running the script automatically, the user controlling the SUT, selects the image 42 as a reference image that is stored (at that particular resolution and size) alongside the test description as metadata so that when the test description is automatically run on a further SUT 290 thereonafter, the automated test can use the stored image to locate the same/similar graphical element within an output screen shot of the further SUT. This may be done in various ways including image analysis techniques known to the skilled person.

FIG. 5*b* shows the graphical output of a further SUT 290 wherein the further SUT 290 is being controlled by the local computer using the test description previously generated using the SUT 290 outputting the screen shot shown in FIG. 5*a*. In this example the further SUT 290 is different to the SUT 290 used to output the screen image in FIG. 5*a*. The further SUT 290 in this example is running a different hardware/operating system configuration and has output the same image element 42 at a half the scale. When the test description uses image analysis to try and find this expected element 42 using the saved image, it may fail due to the different image size. The failure will not be representative of the further SUT 290 failing to operate properly, but a failure of the local computer to find an image element that is actually present.

To help circumvent this issue, the example described herein creates one or more image transforms of the saved image and searches the screen shot of FIG. 5*b* using this image element transform.

The transformation is preferably an image transformation including any one or more of, but not limited to, (including combinations): a color transformation of the saved image; a resolution transformation of the saved image; a dimensional scaling of the saved image; a rotation of the saved image; a vertical mirroring of the saved image; a horizontal mirroring of the saved image; a stretching of the saved image; a skewing of the saved image.

In this example shown in FIGS. 5*a* and 5*b*, the saved image of element 42 is transformed by scaling by a half. When searching for the expected image element 42 in the screen shot 4 from the further SUT shown in FIG. 5*b*, using the scaled version of the saved image finds the downscaled expected image element 42.

The information used to determine the type and quantity/degree of transformation may be obtained in any suitable way including, but not limited to, automatically determining transform data from analysing the configuration of the further SUT 290, the user creating the script specifying one or more transforms, or any other suitable method of inputting transform data.

Any number of transforms of the saved image may be made, including of different types. For example, the transforms may include three different scaling factors and three different colors for each scaling (hence nine different transformations in total). The transforms of the saved image may be completed at any time, including, but not limited to, before running the test description on the further SUT 290 or during the running of the test description on the further SUT.

The use of the transformed images may be made after an image search has failed using the original (untransformed) image. Alternatively the transformed images may be used instead of using the original saved image (i.e. a transformed saved image is the first image used in the image analysis to find the expected element). The method may search for the expected image element sequentially using a preferred order of transformed images.

As may be apparent then from the foregoing figures and description, and depending upon the design and intent, and the types of systems to be tested or controlled, one or more approaches may be provided or available within the operation of the programmerator system 200. The programmerator and methods associated therewith present an enormous amount of flexibility in the creation of a spectacularly universal and easy-to-use and easy-to-operate test system.

While the foregoing discussion details various exemplary embodiments of the disclosure, no material limitations to the scope of the claimed invention are intended. The variants that would be possible from a reading of the present disclosure are too many in number for individual listings herein, though they are understood to be included in the scope of the present disclosure. Further, features and design alternatives that would be obvious from this disclosure to one of ordinary skill in the art are considered to be incorporated also.

The methods described herein may be embodied in one or more pieces of software. The software is preferably held or otherwise encoded upon a memory device such as, but not limited to, any one or more of, a hard disk drive, RAM, ROM, solid state memory or other suitable memory device or component configured to software. The methods may be realised by executing/running the software. Additionally or alternatively, the methods may be hardware encoded.

The methods encoded in software or hardware are preferably executed using one or more processors. The memory and/or hardware and/or processors are preferably comprised as, at least part of, one or more servers and/or other suitable computing systems.

Features of the present disclosure may include any one or more of the following (the following features of the present disclosure, listed below, may be modified or amended using any other features or principles disclosed herein):

In combination, a communications interface between a local computer and a remote system having a graphical user interface; a scripting language; graphical user interface language extensions that enable said scripting language to control said remote system responsive to images appearing on said remote system graphical user interface; and a remote system database operative in association with an application and through an explorer separate and distinct from said application; whereby the database is accessed through said explorer and data retrieved therefrom compared with information obtained from said application accessing said database.

A method for remotely testing the operation of a computer system, comprising the steps of: receiving a first element of said computer system graphical user interface; generating a user input action within said computer system responsive to said first element; monitoring said computer system graphical user interface for an expected second element and for a transformation of said expected second element within a predetermined time interval; and signalling a failure if said predetermined time interval elapses without detecting said expected second element or said transformation of said expected second element.

A programmerator enabling a local system to remotely operate a computer system through local scripts and selectively respond to changes in graphical displays upon a graphical user interface of said remote computer system, comprising: a command capture interface that displays a depiction of said remote system graphical user interface display and captures user input made therein; an automated OCR search engine that operatively searches images captured from said remote computer system, both within and immediately adjacent to said images, to detect and recognize text that may be used to automatically name said captured images; a command language set that when processed by said local system implements both of user input emulations representative of said captured user input at said remote computer system and image processing of said remote computer system graphical displays; a scripting language having scripting commands that control a flow of execution of said local system in combination with said command language set; and an interface for communicating between said local system and said remote computer system graphical user interface responsive to said command and scripting languages.

A scaling image search system operative in GUI-based monitoring and testing as shown, described and which may be imputed by those skilled in the art.

An automated image naming apparatus operative in GUI-based monitoring and testing as shown, described and which may be imputed by those skilled in the art.

A database comparison system operative in GUI-based monitoring and testing as shown, described and which may be imputed by those skilled in the art.

A high level interface between a remote computer and local computer operator permits the remote computer to be controlled via a sequence of interactions. The remote computer may be monitored for display information which is expected, and also controlled in the event the expected information either is or is not obtained. Command language extensions are provided which extend and complement a basic scripting language. Scripts with embedded command language extensions may be executed through a remote interface, permitting remote testing, operation and evaluation.

The development of the scripts, including embedded command language extensions and various transformations, may be prepared through execution of commands at the local computer on a depiction of the GUI received from the remote computer, and subsequently saved as a script.

Exemplary embodiments of this disclosure have been described. While such specific examples are shown in the drawings and are herein described in detail, it should be understood, however, that the drawings and detailed description are not intended to limit the scope of the claimed invention to the particular form disclosed by these embodiments. It will be appreciated that variations and modifications may be made to the examples described herein and still fall within the scope of the claimed invention.

What is claimed is:

1. A method for remotely testing the operation of a computer system, the method comprising the steps of:
    receiving, a first element of a graphical user interface of the computer system;
    generating a user input action within said computer system in response to said first element;
    monitoring said computer system graphical user interface for an image transformation of an expected second element by:
        image transforming a saved image, the saved image comprising the expected second element and the saved image transformation comprising a dimensional scaling of the saved image, wherein the dimensional scaling comprises one or more of: a predetermined fixed scaling ratio and a preselected range of possible ratios; and
        scanning the screen image for the transformation of the expected second element using the transformed saved image;
    saving the dimensional scaling upon detection of the image transformed second element using the scaled image; or
    signalling a failure if a predetermined time interval lapses without detecting said transformation of an expected second element; and
    providing an execution system, the execution system remote from the system under test and configured to execute a script comprising language that:
        is associated with an action intended for the system under test; and
        when processed causes the action to be relayed to an execution environment.

2. The method as claimed in claim 1 wherein the expected second element is associated with the execution of the user input action upon the computer system.

3. The method as claimed in claim 1 wherein the image transformation performed on the saved image comprises any one or more of a transformation of:
    a color of the saved image; or
    a resolution of the saved image; or
    a rotation of the saved image; or
    a vertical mirroring of the saved image; or
    a horizontal mirroring of the saved image; or
    a stretching of the saved image; or
    a skewing of the saved image.

4. The method as claimed in claim 1 wherein the execution system is further configured to:
  receive the first element of the graphical user interface of the system under test; and
  monitor the said computer system graphical user interface for the image transformation of the expected second element.

5. The method as claimed in claim 1 further comprising relaying the action from the execution environment to the remote system under test through a graphical user interface.

6. The method as claimed in claim 1 comprising the step of:
  selecting a subsequent user action upon the presence of the said transformation of the expected second element.

7. The method as claimed in claim 1 wherein the step of monitoring said computer system graphical user interface comprises:
  monitoring said computer system graphical user interface for an expected second element and for a transformation of said expected second element.

8. A method for monitoring the operation of a remote system under test using a local computer system, the local computer system configured to control a graphical user interface of the remote system under test; the method comprising the steps of:
  receiving an image of the graphical user interface of the remote system under test;
  detecting an image transformed expected element by:
    image transforming a saved image, the saved image comprising the expected element and the image transformation comprising a dimensional scaling of the saved image, wherein the dimensional scaling comprises one or more of: a predetermined fixed scaling ratio and a preselected range of possible ratios; and
    scanning the received image using a transformed previously saved image;
  wherein the method further comprises:
    selecting a subsequent user action, responsive to the detection of the image transformed expected element;
    saving the dimensional scaling upon detection of the image transformed element using the scaled image; and
  providing an execution system, the execution system remote from the system under test and configured to execute a script comprising language that:
    is associated with an action intended for the system under test; and
    when processed causes the action to be relayed to an execution environment.

9. The method as claimed in claim 8 wherein detecting the transformed expected element comprises the step of:
  executing a script, the script comprising language that is associated with an action intended for the system under test.

10. The method as claimed in claim 8 wherein the image transformation performed on the saved image comprises any one or more of a transformation of:
  a color of the saved image; or
  a resolution of the saved image; or
  a rotation of the saved image; or
  a vertical mirroring of the saved image; or
  a horizontal mirroring of the saved image; or
  a stretching of the saved image; or
  a skewing of the saved image.

11. A programmerator system stored in a memory and configured to give effect to the method as claimed in claim 1.

12. The programmerator system as claimed in claim 11 comprising an execution system comprising:
  a central processing unit;
  a memory;
  an operating system;
  configured to comprise an execution environment for monitoring or detecting the expected elements.

13. A memory comprising commands that when executed by a computer processor gives rise to the method of claim 1.

* * * * *